US005675436A

United States Patent [19]

Damen et al.

[11] Patent Number: 5,675,436

[45] Date of Patent: Oct. 7, 1997

[54] OPTICAL IMAGE PROCESSOR EMPLOYING A NONLINEAR MEDIUM WITH ACTIVE GAIN

[75] Inventors: Theodoor Charlouis Damen, Colts Neck; Hailin Wang, Piscataway, both of N.J.

[73] Assignee: Lucent Technologies Inc., Murray Hill, N.J.

[21] Appl. No.: 416,610

[22] Filed: Apr. 5, 1995

[51] Int. Cl.[6] .............................. G02B 27/46; G06K 9/00

[52] U.S. Cl. .............................. 359/561; 359/559; 359/4

[58] Field of Search .............................. 359/560, 561, 359/559, 7, 3, 29, 4

[56] References Cited

U.S. PATENT DOCUMENTS

| | | | |
|---|---|---|---|
| 4,948,212 | 8/1990 | Cheng et al. | 350/3.64 |
| 4,968,107 | 11/1990 | Yeh | 350/3.64 |
| 5,130,849 | 7/1992 | Valley et al. | 359/571 |
| 5,270,853 | 12/1993 | Bashkansky et al. | 359/326 |
| 5,412,499 | 5/1995 | Chiu et al. | |
| 5,508,829 | 4/1996 | Freeouf et al. | 359/7 |

OTHER PUBLICATIONS

Cleo '94, pp. 224–225.

"High–speed joint–transform optical image correlator using GaAs/AlGaAs semi–insulating multiple quantum wells and diode lasers", A. Partovi et al., *Optics Letters*, vol. 18, No. 11, Jun. 1, 1993, pp. 906–908.

"Compact Photorefractive Correlator For Robotic Applications", H. Rajbenbach et al., *Applied Optics* 31, (1992), pp. 5666–5674.

"Real–Time Vanderlugt Optical Correlator That Uses Photorefractive GaAs", D.T.H. Liu et al., *Applied Optics* 31, (1992), pp. 5675–5680.

Coherence, Amplification and Quantum Effects In Semiconductor Lasers, Y. Yamamoto et al., Chapter 13, 1991, John Wiley & Sons, Inc.

"Nonlinear mixing and phase conjugation in broad–area diode lasers", M. Lucente et al., *Applied Physics Letters*, vol. 53, No. 6, 8 Aug. 1988, pp. 467–469.

"Four–wave mixing and phase conjugation in semiconductor laser media", G. Agrawal, *Optics Letters*, vol. 12, No. 4, Apr. 1987, pp. 260–262.

"Observation of Bistable Reflectivity of a Phase–Conjugated Signal through Intracavity Nearly Degenerate Four–Wave Mixing", H. Nakajima et al., *Physical Review Letters*, vol. 54, No. 16, 22 Apr. 1985, pp. 1798–1801.

"Spatial Convolution and Correlation of Optical Fields Via Degenerate Four–Wave Mixing", D. M. Pepper et al., *Optics Letters*, vol. 3., No. 1, Jul. 1978, pp. 7–9.

Co–pending United States Patent Application Serial No. 08/037,858, filed Mar. 29, 1993 entitled "High–Speed Optical Image Correlator"(Chiu 2–27–1) (Abandoned Feb. 2, 1995).

Co–pending United States Patent Application Serial No. 08/417,308, filed Apr. 5, 1995, entitled "Surface Emitting Laser Having Improved Pumping Efficiency" (T.C. Damen 16).

*Primary Examiner*—Jon W. Henry

[57] ABSTRACT

An optical image processor includes a nonlinear active gain medium for recording an interference pattern that corresponds to the Fourier transform of an input image or the multiplicative product of the Fourier transforms of two respective input images.

8 Claims, 3 Drawing Sheets

OPTICAL IMAGE PROCESSOR EMPLOYING A NONLINEAR MEDIUM WITH ACTIVE GAIN

FIELD OF THE INVENTION

The invention relates to optical image processors of the kind in which image information is stored in a nonlinear medium that imparts gain.

ART BACKGROUND

It has long been recognized that optical image processors can perform a wide variety of optical processes. For example, image correlators are a type of image processor which can be used for pattern recognition. One class of image correlators are known as "joint Fourier transform optical correlators." In these devices, conveniently described with reference to FIG. 1, Fourier-transform lens 80 operates on a pair of coherent images representing a reference R and an unknown object S. The resulting optical intensity distribution in the focal plane of the Fourier-transform lens is recorded in a nonlinear medium 25 that typically comprises a photorefractive material. The output of the correlator is generated by a Fourier-transform lens (also shown in the figure as lens 80). operating on the recorded pattern. Each of two side regions of the output image (symmetrically displaced from the center by the separation between R and S) contains an intensity distribution corresponding to the cross correlation between R and S. The position of a correlation peak identifies the location of a feature of R that resembles S. The height of the peak measures the degree of similarity. A correlator of this kind is described, e.g., in H. Rajbenbach et al., "Compact photorefractive correlator for robotic applications," App. Opt. 31 (1992) 5666–5674. This system used a crystal of $Bi_{12}SiO_{20}$ (BSO) as the photorefractive s medium. With this material, a typical response time of about 50 ms was achieved. Using a crystal about 1 mm thick, diffraction efficiencies of 0.1%–1% were obtained.

A second class of correlators are known as "Vanderlugt optical correlators." These devices are described, e.g., in D. T. H. Liu et al., "Real-time Vanderlugt optical correlator that uses photorefractive GaAs," *Appl. Optics* 31 (1992) 5675–5680. In these correlators, conveniently described with reference to FIG. 2, the Fourier transform of, e.g., the S image is written in nonlinear medium 25 by interfering it with reference beam 5, which is typically a plane wave. The output of the correlator is generated by using lens 84 to create a Fourier transform of the R image, which is impinged on the photorefractive medium. As depicted in the figure, lens 82 is used both to generate the Fourier transform of the S image, and to generate the inverse Fourier transform of the output from the nonlinear medium.

The system described by D. T. H. Liu et al. used a crystal of gallium. arsenide, 5 mm thick, as the photorefractive medium. Diffraction efficiencies less than 0.1% were obtained. The shortest response time measured was 0.8 ms at a laser intensity of about 1.5 $W/cm^2$.

U.S. application Ser. No. 08/037,858 filed Mar. 29, 1993, discloses an optical image correlator that uses the nonlinear optical properties of semi-insulating, multiple quantum well (SI-MQW) structures. This system can perform correlation operations in 1 μs or less with diffraction efficiencies as great as 3% or less.

One limitation of known optical image processors such as those described above is that the nonlinear materials they employ are passive structures that absorb significant amounts of optical energy. As a result, the output from the image processor is often as much as two orders of magnitude smaller than the magnitude of the input signal. More efficient photorefractive materials may be employed to reduce the optical absorption, but at the expense of a decreased response time.

Accordingly, it is desirable to provide an optical image processor that has a rapid response time so that great volumes of data can be processed while at the same time imparting gain to the input signal rather than a loss.

SUMMARY OF THE INVENTION

The invention relates to an optical image processor of the kind that includes an input source and an output source of coherent light. (The term "light" is meant to include invisible portions of the electromagnetic spectrum, such as infrared radiation.) The input source provides input beams of light that may include a control beam and a signal beam. The processor further includes means for impressing on the input light spatial intensity modulation patterns corresponding to at least one input image, a lens for creating a Fourier transform of the modulation pattern, and a nonlinear medium for recording the Fourier transform as an absorption-modulation and/or refractive modulation pattern, and for modulating the output light in accordance with the recorded pattern. In contrast to processors of the prior art, the nonlinear medium of the inventive processor includes an active gain medium such as a vertical-cavity surface-emitting laser or an optically pumped gain medium. By using an active medium the resulting processor provides an output that exhibits less loss in power than the known processors without a significant sacrifice in response time. As a result, a plurality of such processes may be cascaded together without concern for power degradation. Moreover, the process may be employed to perform a variety of processing functions by feeding back the optical signal through the gain medium a plurality of times from different spatial locations.

DETAILED DESCRIPTION

Figure 1:
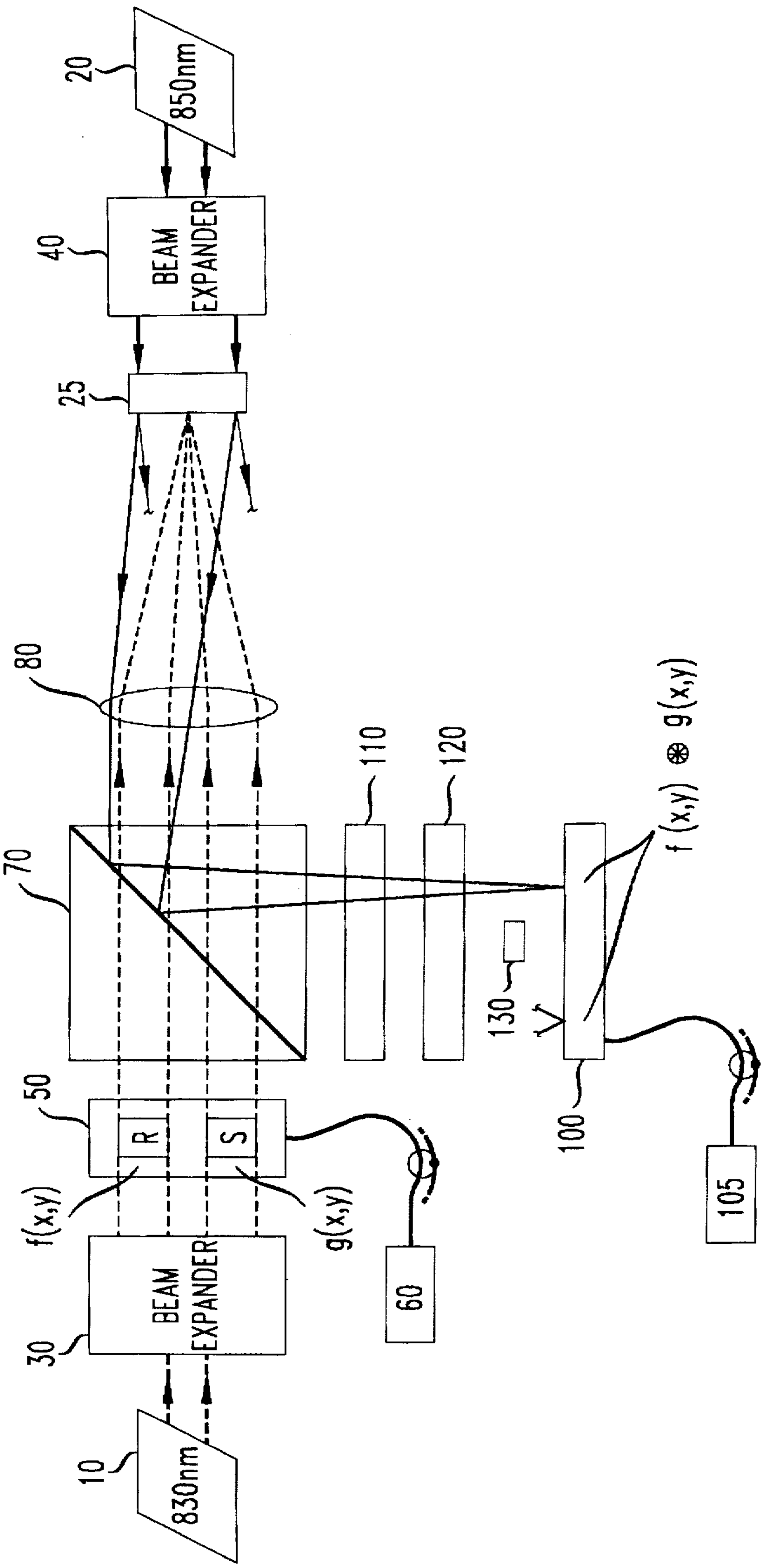
FIG. 1 (PRIOR ART)
FIG. 1 is a schematic, block diagram of a joint Fourier transform optical image correlator.
Figure 2:
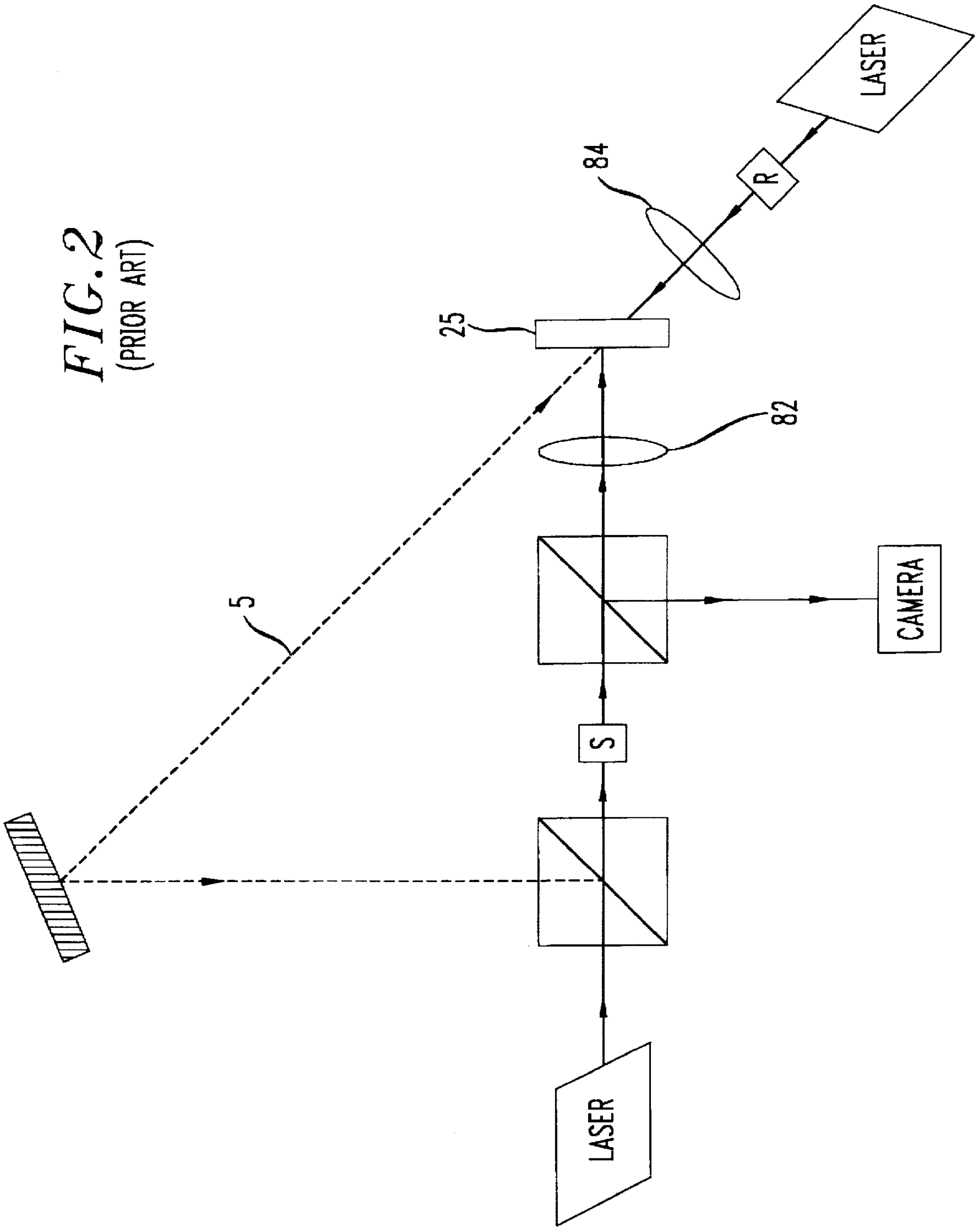
FIG. 2 (PRIOR ART)
FIG. 2 is a schematic, block diagram of a Vanderlugt optical image correlator.

The inventive processor will be described as either a joint Fourier transform correlator or a Vanderlugt correlator. In either case, the general features of the processor are well known. A joint Fourier transform correlator is described, e.g., in H. Rajbenbach et al., cited above. A Vanderlugt correlator is described, e.g., in D. T. H. Liu et al., cited above. By way of illustration, we now briefly describe, with reference to FIG. 1, a joint Fourier transform correlator that we have used successfully in experimental trials. Modifications of this system to achieve, instead, a Vanderlugt correlator will be readily apparent to the skilled practitioner.

A beam of input light is provided by laser 10, which is exemplary a vertically polarized, 150 mW, single longitudinal mode diode laser emitting at 830 nm. A beam of output light is provided by laser 20, which is exemplary a vertically polarized, single longitudinal mode diode laser emitting at 850 nm. Laser 20 is typically operated at a power level of about 10 mW. Its emission wavelength can be temperature-tuned to maximize the diffraction efficiency from photorefractive medium 25. The beam from each of lasers 10 and 20 is passed through an optical subsystem 30, 40 consisting of a lens, an anamorphic prism pair, and a beam expander. These subsystems expand and collimate the laser beams.

Modulator 50 is exemplary a liquid-crystal, spatial light modulator such as sold by the Epson corporation as the Epson Crystal Image Video Projector. This modulator has an aperture of 2.0 cm×2.6 cm, and a pixel resolution of 320×220. This modulator, as purchased, includes polarizer films that are removed before the modulator is incorporated in the correlator. The modulator is driven with a video signal from video source 60 to produce a control beam and a signal beam which in the particular case of a correlator correspond to a pair of side-by-side images R and S, respectively. (At this stage, the images are not visible because they exist only as a polarization rotation.) Polarizing beam-splitter cube 70 converts the pattern of polarization rotation to a pattern of intensity modulation.

Lens 80, exemplary a doublet lens with a focal length of 26 cm, operates on the input beam to produce a Fourier transform of the input images. More precisely stated, nonlinear medium 25, situated at the Fourier plane of lens 80, records the interference pattern corresponding to the multiplicative product of the Fourier transforms of the respective input images.

The output beam reads the recorded pattern by passing through the nonlinear medium. The output beam then passes through lens 80, with the result that the inverse Fourier transform of the recorded pattern is carried by the output beam. The output beam then falls on CCD camera 100 situated at the back focal plane of lens 80. The output of camera 100 is recorded by frame grabber 105. To remove spurious light at 830 nm (i.e., the wavelength of the input beam), a band-pass interference filter 110 centered at 850 nm (i.e., the wavelength of the output beam) is placed between lens 80 and camera 100. To reduce the optical intensity impinging on camera 100, a neutral density filter 120 (typically with a density of 1) is also placed between the lens and the camera A beam block 130 situated between the leans and the camera excludes that component of the output beam having zero spatial frequency.

In contrast to processors of the prior art, nonlinear medium 25 of the inventive correlator is an optically pumped semiconductor material that imparts gain to an input beam. Devices of this kind that may be employed in the present invention are described generally in Y. Yamamoto et al., *Coherence, Amplification and Quantum Efficiency in Semiconductor Lasers*, Ch. 13, 1991, John Wiley & Sons, Inc. While prior art processors employ photorefractive materials to achieve nonlinear results, the inventive processor takes advantage of the nonlinear properties that are inherent in semiconductor materials. One class of optically pumped semiconductor materials that may be employed is a vertical-cavity surface-emitting laser (VCSEL) structure operating below its lasing threshold. A VCSEL is composed of an active gain material such as a GaAs/AlGaAs multilayer structure which is disposed between mirrors that form a Fabry-Perot cavity. These structures can produce gain by electrical injection. The cavity increases the efficiency of the device by providing feedback to the input signal so that the total gain is increased over that imparted by the active gain material itself. The nonlinear nature of a VCSEL device has been Used to demonstrate four-wave mixing in Jiang et al., Conference on Lasers and Electrooptics, vol. 8, pp. 224–225, 1984, OSA Technical Digest Series, Optical Society of America. However, this reference does not show the use of a VCSEL structure in an optical image processor.

Figure 3:
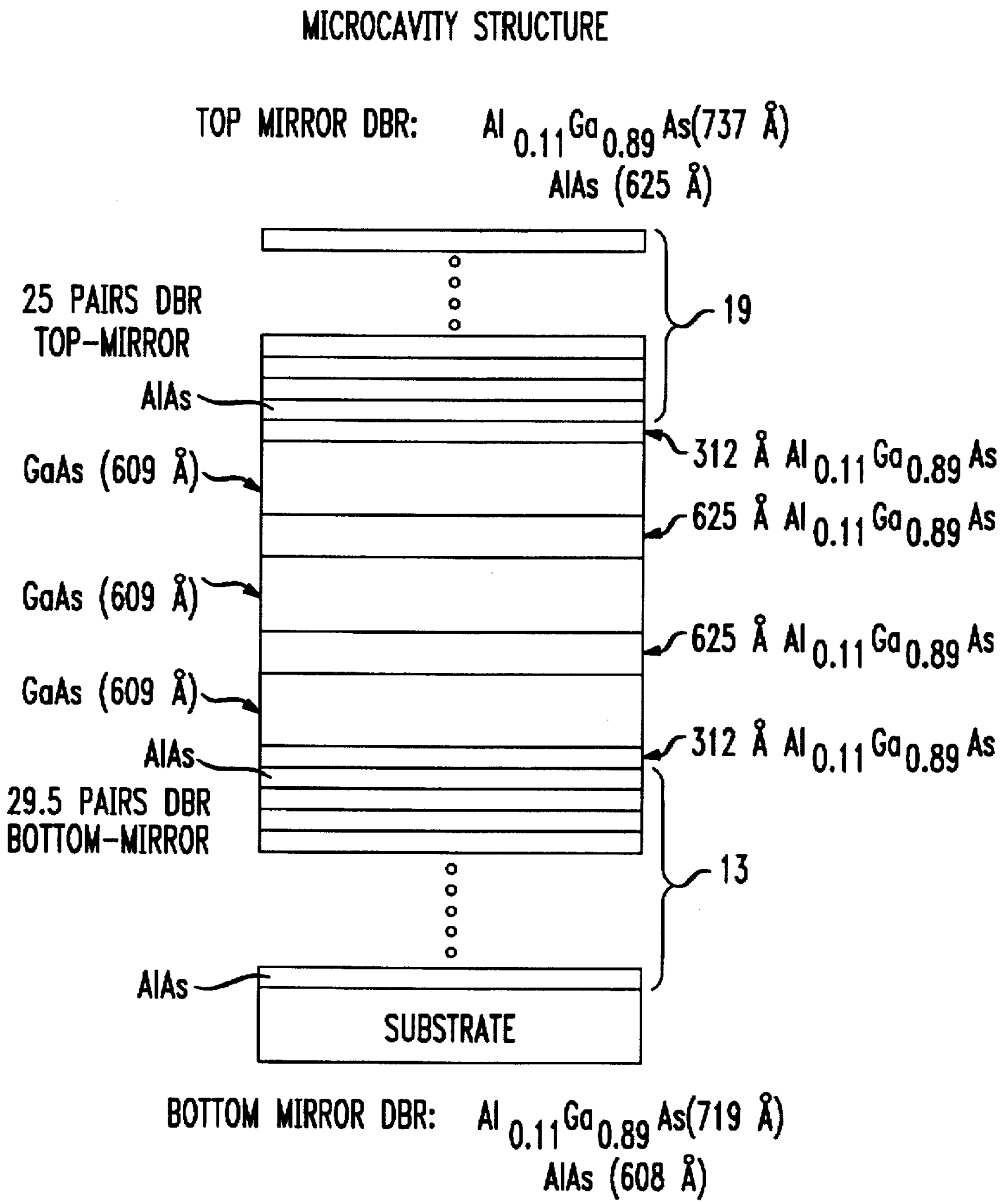
FIG. 3 shows an example of a VCSEL structure that may serve as the active gain medium in the image processor of the present invention.

By way of illustration, we now briefly describe a VCSEL device that may be used in the inventive processor. This device is more fully described in U.S. Pat. No. 5,513,203 entitled *Surface Emitting Laser Having Improved Pumping Efficiency*, filed in the U.S. Patent and Trademark Office on the same date as the present application which is hereby incorporated by reference. FIG. 3 shows a VCSEL structure designed to operate at a wavelength of 870 nm. The top mirror 19 is formed from 25 pairs of alternating layers of $Al_{0.11}Ga_{0.89}As$ (737 Å) and AlAs (625 Å) and the bottom mirror is formed from 29.5 pairs of $Al_{0.11}Ga_{0.89}As$ (719 Å) and AlAs (608 Å). The gain medium is formed from three active layers of GaAs (609 Å) each separated by barrier layers of $Al_{0.11}Ga_{0.89}As$ (625 Å). A barrier layer of $Al_{0.11}Ga_{0.89}As$ (312 Å) is interposed between the active layers and each of the mirrors 13 and 19. The active layers are located at the antinodes of the standing wave supported between the mirrors 13 and 19 to maximize efficiency. The high reflectivity bandwidth of the bottom mirror 13 is shifted by approximately 14 nm relative to the top mirror 19. The mirrors 13 and 19 are also "unbalanced," as this term is defined in U.S. Pat. No. 4,999,842, for example. That is, the bottom mirror 13 employs a greater number of alternating layers than the top mirror 19. As a result, the reflectivity of the bottom mirror 13 is greater than the reflectivity of the top mirror 19 at the design wavelength. The optical output beam will be emitted from the top mirror 19 because of its decreased reflectivity relative to the bottom mirror 13.

It should be noted in this regard that the semiconductor material is not necessarily based on a III-V material system. For example, II-VI materials may also be employed as the active gain material.

We claim:

1. An optical image processor, comprising:

a) first and second coherent input beams of light;

b) means for impressing on the first input beam a coherent spatial, intensity-modulation pattern corresponding to at least a first input image;

c) a lens for creating a Fourier transform of the modulation pattern;

d) a third input beam having impressed thereon a coherent modulation pattern corresponding to at least a second input image; and e) a nonlinear medium for coherent processing by a four-wave mixing process, (i) the modulation pattern created from the Fourier transform, (ii) said second input beam and (iii) the second input image, to generate a modulated output beam, said nonlinear medium including an active gain medium operable to impart gain, by at least one of optical pumping and electrical injection, to the first input beam having an intensity modulation pattern impressed thereon.

2. Apparatus of claim 1, wherein said active gain medium comprises intrinsic III-V material.

3. Apparatus of claim 1, wherein said active gain medium comprises intrinsic II-VI material.

4. Apparatus of claim 1, wherein said active gain medium comprises a vertical-cavity surface-emitting laser.

5. Apparatus of claim 2, wherein the III-V material comprises GaAs and $Al_xGa_{1-x}$ As, where x is a number between 0 and 1.

6. Apparatus of claim 1, wherein the means for impressing an intensity-modulation pattern comprise an intrinsic, multiple quantum well device.

7. Apparatus of claim 1, further comprising means for impressing on the output beam a spatial, intensity-modulation pattern corresponding to at least the second input image when the second input image correlates with the first input image.

8. Apparatus of claim 1 wherein the first input beam is a signal beam and the third input beam is a control beam.

* * * * *